United States Patent
Henry et al.

(10) Patent No.: US 10,685,594 B2
(45) Date of Patent: Jun. 16, 2020

(54) CALIBRATING BRIGHTNESS VARIATION IN A DISPLAY

(71) Applicant: Facebook Technologies, LLC, Menlo Park, CA (US)

(72) Inventors: William Padraic Henry, Cork (IE); Ilias Pappas, Cork (IE)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 16/058,988

(22) Filed: Aug. 8, 2018

(65) Prior Publication Data

US 2019/0347974 A1    Nov. 14, 2019

(30) Foreign Application Priority Data

May 8, 2018    (GR) .............................. 20180100191

(51) Int. Cl.
*G09G 3/20* (2006.01)
*G02B 27/01* (2006.01)
*G09G 3/3258* (2016.01)
*G09G 3/3233* (2016.01)

(52) U.S. Cl.
CPC ....... *G09G 3/2003* (2013.01); *G02B 27/0172* (2013.01); *G09G 3/3233* (2013.01); *G09G 3/3258* (2013.01); *G02B 2027/0178* (2013.01); *G09G 2310/08* (2013.01); *G09G 2320/0233* (2013.01)

(58) Field of Classification Search
CPC .............. G09G 3/3413; G09G 3/3426; G09G 2310/0235; G09G 2320/0633; G09G 2320/064; G09G 2360/16
See application file for complete search history.

(56) References Cited

U.S. PATENT DOCUMENTS

| | | | |
|---|---|---|---|
| 5,053,771 | A | 10/1991 | McDermott |
| 8,779,346 | B2 | 7/2014 | Fowler et al. |
| 9,094,629 | B2 | 7/2015 | Ishibashi |
| 9,363,454 | B2 | 6/2016 | Ito et al. |
| 9,800,260 | B1 | 10/2017 | Banerjee |
| 2002/0067303 | A1 | 6/2002 | Lee et al. |
| 2003/0020100 | A1 | 1/2003 | Guidash |

(Continued)

OTHER PUBLICATIONS

U.S. Appl. No. 15/847,517, "Notice of Allowance", dated May 1, 2019, 11 pages.

(Continued)

*Primary Examiner* — Nelson M Rosario
(74) *Attorney, Agent, or Firm* — Kilpatrick Townsend & Stockton LLP

(57) ABSTRACT

A method and system for calibrating brightness variation in a display involve measuring brightness levels of light emitters in the display. The light emitters are divided into different groups based on the measured brightness levels. Each group is assigned a sub-frame duration. Groups with higher brightness are assigned shorter sub-frame durations than groups with lower brightness. Calibration information is stored for driving the light emitters such that during a frame period of the display, the light emitters are activated for durations corresponding to the sub-frame duration of their corresponding group.

20 Claims, 13 Drawing Sheets

(56) References Cited

U.S. PATENT DOCUMENTS

| | | | |
|---|---|---|---|
| 2007/0024772 A1* | 2/2007 | Childers | G09G 3/3413 349/68 |
| 2007/0222881 A1 | 9/2007 | Mentzer | |
| 2010/0171442 A1* | 7/2010 | Draper | H05B 33/0869 315/297 |
| 2010/0276572 A1 | 11/2010 | Iwabuchi et al. | |
| 2011/0254986 A1 | 10/2011 | Nishimura et al. | |
| 2012/0133807 A1 | 5/2012 | Wu et al. | |
| 2012/0262616 A1 | 10/2012 | Sa et al. | |
| 2013/0056809 A1 | 3/2013 | Mao et al. | |
| 2013/0141619 A1 | 6/2013 | Lim et al. | |
| 2013/0207219 A1 | 8/2013 | Ahn | |
| 2014/0042299 A1 | 2/2014 | Wan et al. | |
| 2015/0189209 A1 | 7/2015 | Yang et al. | |
| 2015/0216016 A1* | 7/2015 | Reed | H05B 37/0218 315/159 |
| 2015/0279884 A1 | 10/2015 | Kusumoto | |
| 2015/0312502 A1 | 10/2015 | Borremans | |
| 2016/0028974 A1 | 1/2016 | Guidash et al. | |
| 2016/0088253 A1 | 3/2016 | Tezuka | |
| 2016/0100115 A1 | 4/2016 | Kusano | |
| 2016/0165160 A1 | 6/2016 | Hseih et al. | |
| 2017/0111600 A1 | 4/2017 | Wang et al. | |
| 2017/0346579 A1 | 11/2017 | Barghi | |

OTHER PUBLICATIONS

International Application No. PCT/US2019/014044, "International Search Report and Written Opinion", dated May 8, 2019, 11 pages.
U.S. Appl. No. 15/847,517, "Non-Final Office Action", dated Nov. 23, 2018, 21 pages.
International Application No. PCT/US2018/039352, "International Search Report and Written Opinion Received", dated Oct. 26, 2018, 10 pages.
International Application No. PCT/US2018/039431, "International Search Report and Written Opinion", dated Nov. 7, 2018, 14 pages.
European Application No. EP18179838.0, "Partial European Search Report", dated Dec. 5, 2018, 14 pages.
European Application No. EP18179851.3, "Extended European Search Report", dated Dec. 7, 2018, 8 pages.

* cited by examiner

CALIBRATING BRIGHTNESS VARIATION IN A DISPLAY

CROSS-REFERENCE TO RELATED APPLICATIONS

This application claims the benefit and priority under 35 U.S.C. 119(a)-(d) of Greece Patent Application No. 20180100191, filed May 8, 2018, entitled "Calibrating Brightness Variation in a Display," which is incorporated herein by reference in its entirety for all purposes.

BACKGROUND OF THE INVENTION

Liquid crystal displays (LCDs), organic light-emitting diode (OLED) displays, and other types of digital displays include light emitting elements that form pixels on the display. Ideally, the light emitting elements all have the same performance characteristics and all meet some specified performance criteria. In reality, the light emitting elements are subject to manufacturing variations, degradation in performance over the lifetime of the display, and other factors that contribute to differences in performance. To correct for performance differences, displays are sometimes calibrated prior to integration into an end-user product such as a television set, a display monitor, or a mobile device. Calibration techniques exist which seek to compensate for deviations in output parameters such as color or brightness. Conventional calibration techniques generally calibrate each light emitting element independently, without considering the performance of other light emitting elements in the display.

BRIEF DESCRIPTION OF THE DRAWINGS

Illustrative embodiments are described with reference to the following figures.

Figure 1:
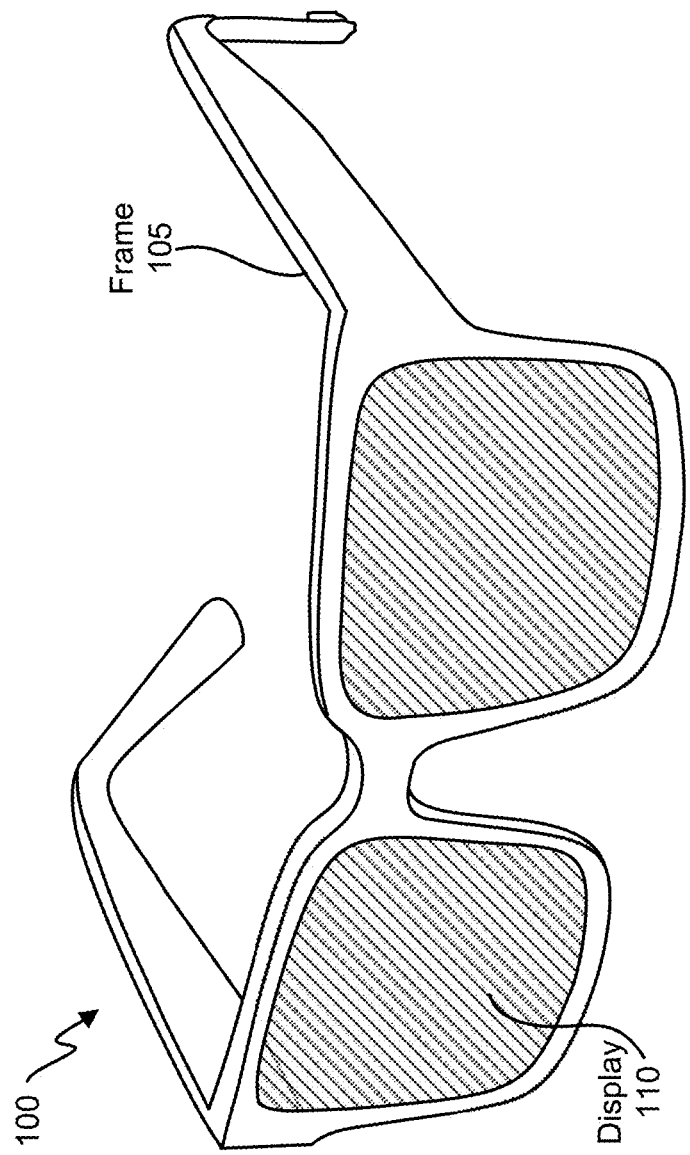
FIG. 1 shows an embodiment of a near-eye display.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

In the following description, for the purposes of explanation, specific details are set forth in order to provide a thorough understanding of certain inventive embodiments. However, it will be apparent that various embodiments may be practiced without these specific details. The figures and description are not intended to be restrictive.

Example embodiments of the present invention relate to a method for calibrating brightness variation in a display. The method can be performed any time after the display is manufactured and involves measuring brightness levels of light emitters, such a micro-LEDs (mLEDs) embedded in the display. The method includes dividing the light emitters into different groups based on the measured brightness levels. For example, the light emitters can be grouped such that the brightnesses of light emitters of any particular group are the same or approximately the same (e.g., within a certain brightness range). Each group is then assigned a sub-frame duration, with groups that have higher brightness being assigned shorter sub-frame durations than groups that have lower brightness.

When an image is output on a display, the light emitters are activated to illuminate the display for a defined time period, known as a frame. The display is configured to generate frames at a certain speed, according to a refresh rate of the display. Each frame period can be divided into smaller time periods, known as sub-frames. The process of assigning different sub-frame durations to different groups is referred to herein as "frame binning." With appropriate frame binning, the light emitters can be activated such that they are perceived as equally bright when viewed by a human. The human eye integrates brightness so that, provided the frame is displayed fast enough, the light emitters are perceived as a single unit (e.g., an entire frame of pixels) and the fact that certain light emitters may not be activated for the entire frame period goes unnoticed.

The method can include a step of storing calibration information for driving the light emitters such that during a frame period of the display, the light emitters are activated for durations corresponding to the sub-frame duration of their corresponding group. The order in which the light emitters are activated can vary. For example, light emitters with longer sub-frame durations can be activated before light emitters with shorter sub-frame durations. In some embodiments, sub-frames may overlap in time so that light emitters of different groups are activated simultaneously.

Example embodiments of the present invention relate to a computer system for calibrating a display. The computer system includes at least one optical sensor operable to measure the brightness levels of the light emitters. The computer system further includes one or more processors operable to execute instructions stored on a memory of the computer system. The instructions cause the one or more processors to perform a calibration by dividing the light emitters into different groups based on the measured brightness levels, assigning different sub-frame durations to the groups based on brightness, and storing calibration information for driving the light emitters such that during a frame period of the display, the light emitters are activated for durations corresponding to the sub-frame duration of their corresponding group.

In some embodiments, calibration information is stored by individually programming the light emitters, so that the light emitters can self-adjust when driven. In other embodiments, calibration information is stored external to the light emitters, for example in a lookup table contained within a memory of the display or within a memory of a display device into which the display is integrated.

In some embodiments, calibration is performed after the display has been integrated into a display device. For example, the display device may include at least one optical sensor operable to measure the brightness levels during the life of the display. Changes in brightness over time can therefore be compensated for.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a near-eye display (NED) connected to a host computer system, a standalone NED, a mobile device or computing system, or any other hardware platform capable of providing artificial reality content to one or more viewers.

Example embodiments are described herein with respect to calibration of a display in a wearable display device, in particular a near-eye display. However, the example calibration techniques described herein can be applied to calibrate any type of digital display. Example embodiments are described in connection with pulse width modulation control for selective activation of emitters over a specified duration. Other control techniques for selectively activating emitters are also possible.

Example embodiments are described with respect to a current mode display, where light emitters of the display are driven using currents. However, the example embodiments are equally applicable to voltage mode displays. Therefore steps described as being performed using currents can alternatively be performed using voltages.

FIG. 1 shows an embodiment of an NED 100 that can be calibrated using the methods described herein. The NED 100 presents media to a user. Examples of media presented by the NED 100 include at least one of images, video, audio, or some combination thereof. In some embodiments, audio is presented via an external device (e.g., speakers and/or headphones) that receives audio information from the NED 100, a console (not shown), or both, and presents audio data based on the audio information. The NED 100 can be configured to operate as a VR display. In some embodiments, the NED 100 operates as an AR display and/or an MR display.

The NED 100 includes a frame 105 and a display 110. The frame 105 is coupled to one or more optical elements. The frame 105 can be adapted to be worn by the user, for example supported against the user's ears and temples in the manner of a pair of eyeglasses. Thus, the NED 100 can be a head mounted display (HMD). Other mechanisms for attaching an HMD to a user's head are possible. For example, in some embodiments, the NED 100 may include an adjustable band for securing the NED 100 around the back of the head. The display 110 is configured for the user to see content presented by the NED 100. In some embodiments, the display 110 includes a waveguide assembly for directing light from one or more images to an eye of the user.

Figure 2:
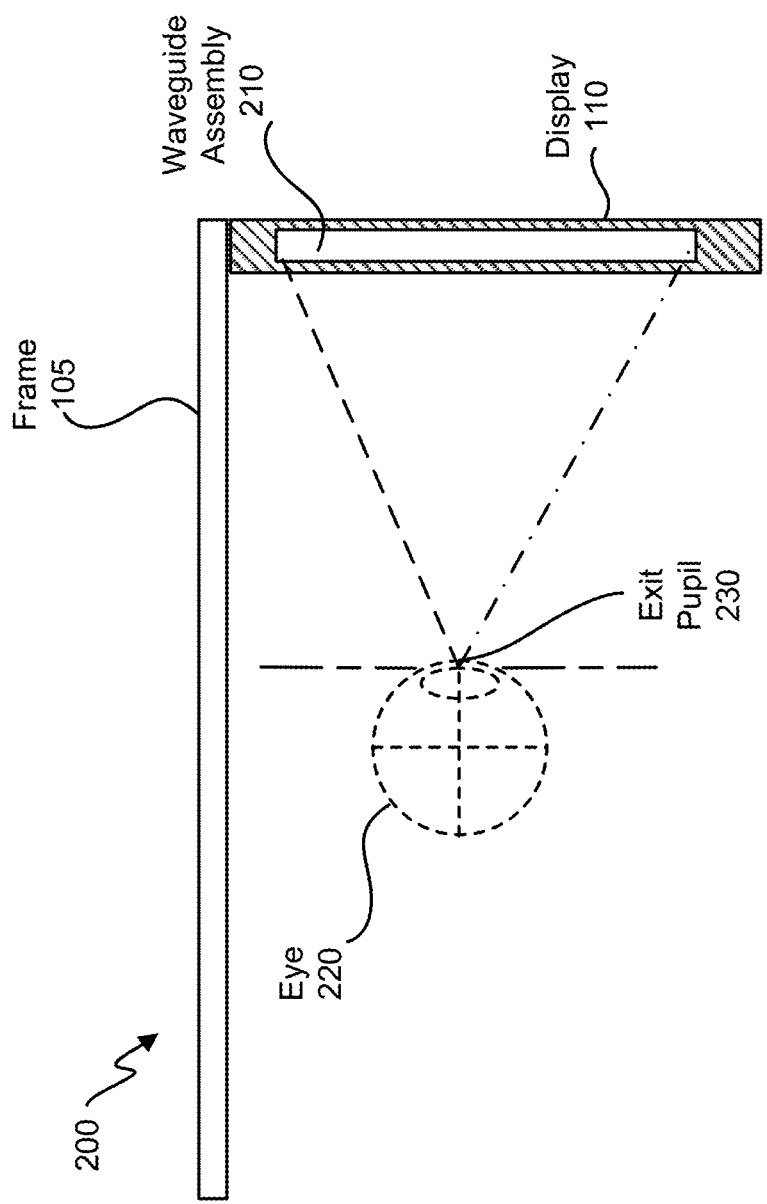
FIG. 2 is a cross sectional view of the near-eye display of FIG. 1.

FIG. 2 is an embodiment of a cross section 200 of the NED 100 illustrated in FIG. 1. The display 110 includes at least one waveguide assembly 210. An exit pupil 230 is at a location where the eye 220 is positioned in an eyebox region when the user wears the NED 100. For purposes of illustration, FIG. 2 shows the cross section 200 associated with a single eye 220 and a single waveguide assembly 210, but a second waveguide assembly can be used for a second eye of the user.

The waveguide assembly 210 is configured to direct the image light to the eye 220 through the exit pupil 230. The waveguide assembly 210 may be composed of one or more materials (e.g., plastic, glass, etc.) with one or more refractive indices. In some embodiments, the NED 100 includes one or more optical elements between the waveguide assembly 210 and the eye 220. The waveguide assembly 210 may be composed of one or more materials (e.g., plastic, glass, etc.) with one or more refractive indices that effectively minimize the weight and widen a field of view (FOV) of the NED 100. In alternate configurations, the NED 100 includes one or more optical elements between the waveguide assembly 210 and the eye 220. The optical elements may act to, e.g., correct aberrations in image light emitted from the waveguide assembly 210, magnify image light emitted from the waveguide assembly 210, some other optical adjustment of image light emitted from the waveguide assembly 210, or some combination thereof. The example for optical elements may include an aperture, a Fresnel lens, a convex lens, a concave lens, a filter, a reflector, or any other suitable optical element that affects image light.

Figure 3:
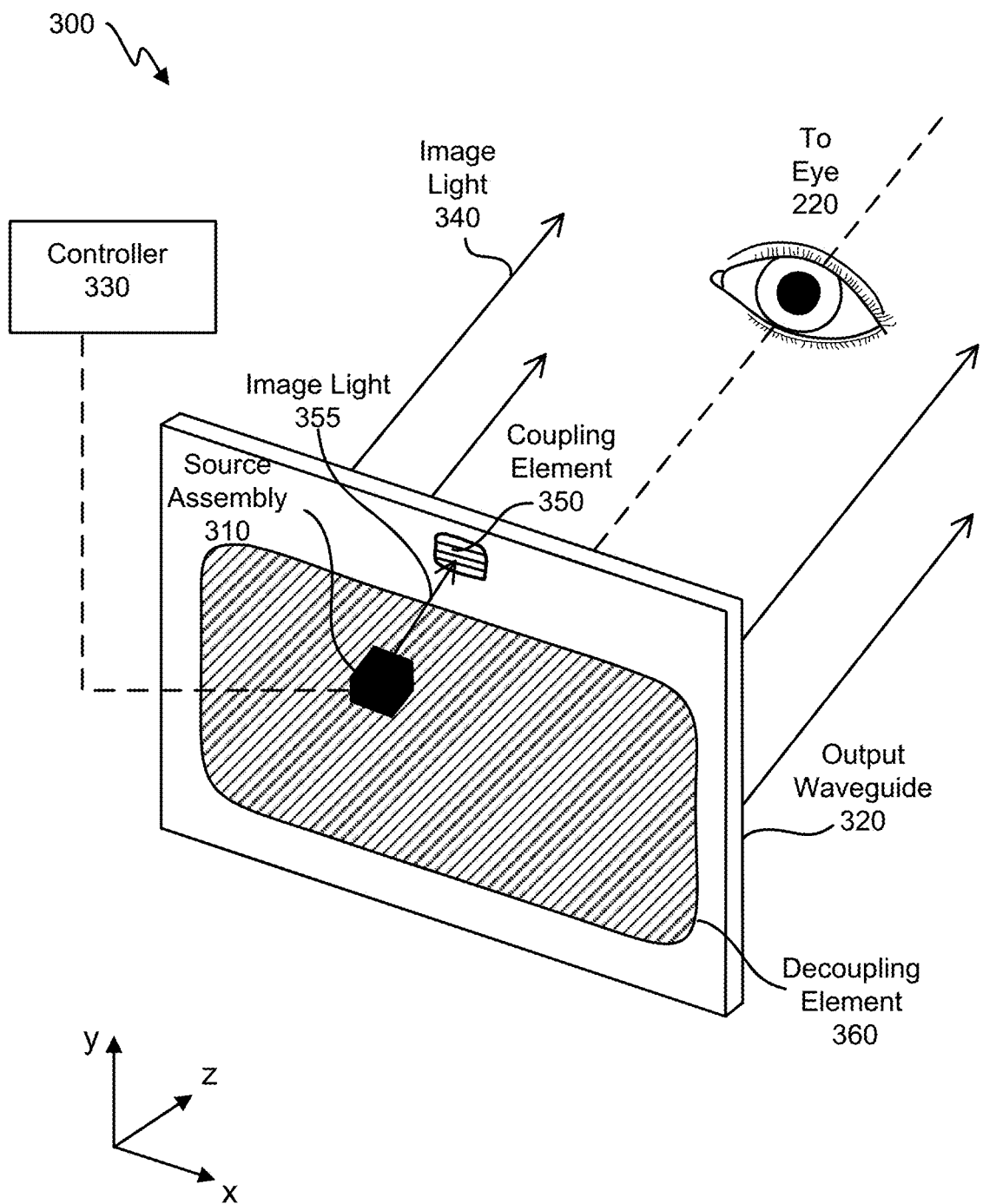
FIG. 3 is an isometric view of an embodiment of a waveguide assembly.

FIG. 3 illustrates an isometric view of a waveguide assembly 300, in accordance with one or more embodiments. In some embodiments, the waveguide assembly 300 is a component of the NED 100 (e.g., waveguide assembly 210). The waveguide assembly 300 includes a source assembly 310, an output waveguide 320, and a controller 330.

The source assembly 310 generates image light 355 using a plurality of light emitters. A light emitter can be an LED, an mLED, a vertical-cavity surface-emitting laser (VCSEL), a photonics integrated circuit (PIC), etc. The light emitters can be organized in a one-dimensional (1D) or two-dimensional (2D) array.

The source assembly 310 can include an optics system (not shown) comprising one or more optical elements (e.g., one or more lenses) that perform a set of optical processes, including, but not restricted to, focusing, combining, collimating, transforming, conditioning, and scanning processes on the image light generated by the source assembly 310. In some embodiments, the optics system includes a scanning mirror configured to scan in one or more directions under the control of the controller 330. For example, the scanning mirror may scan the array of light emitters to map light emitted by the light emitters to a 2D image having a higher resolution than the resolution of the array.

The output waveguide 320 is an optical waveguide that outputs images to the eye 220 of the user. The output waveguide 320 receives the image light 355 (possibly after processing through the one or more optical elements of the optics system) at one or more coupling elements 350, and guides the image light 355 to a decoupling element 360. The coupling element 350 may include, e.g., a diffraction grating, a holographic grating, some other element that couples the image light 355 into the output waveguide 320, or some combination thereof. For example, in embodiments where the coupling element 350 includes a diffraction grating, the pitch of the diffraction grating can be chosen such that total internal reflection occurs and the image light 355 propagates internally toward the decoupling element 360.

Figure 4:
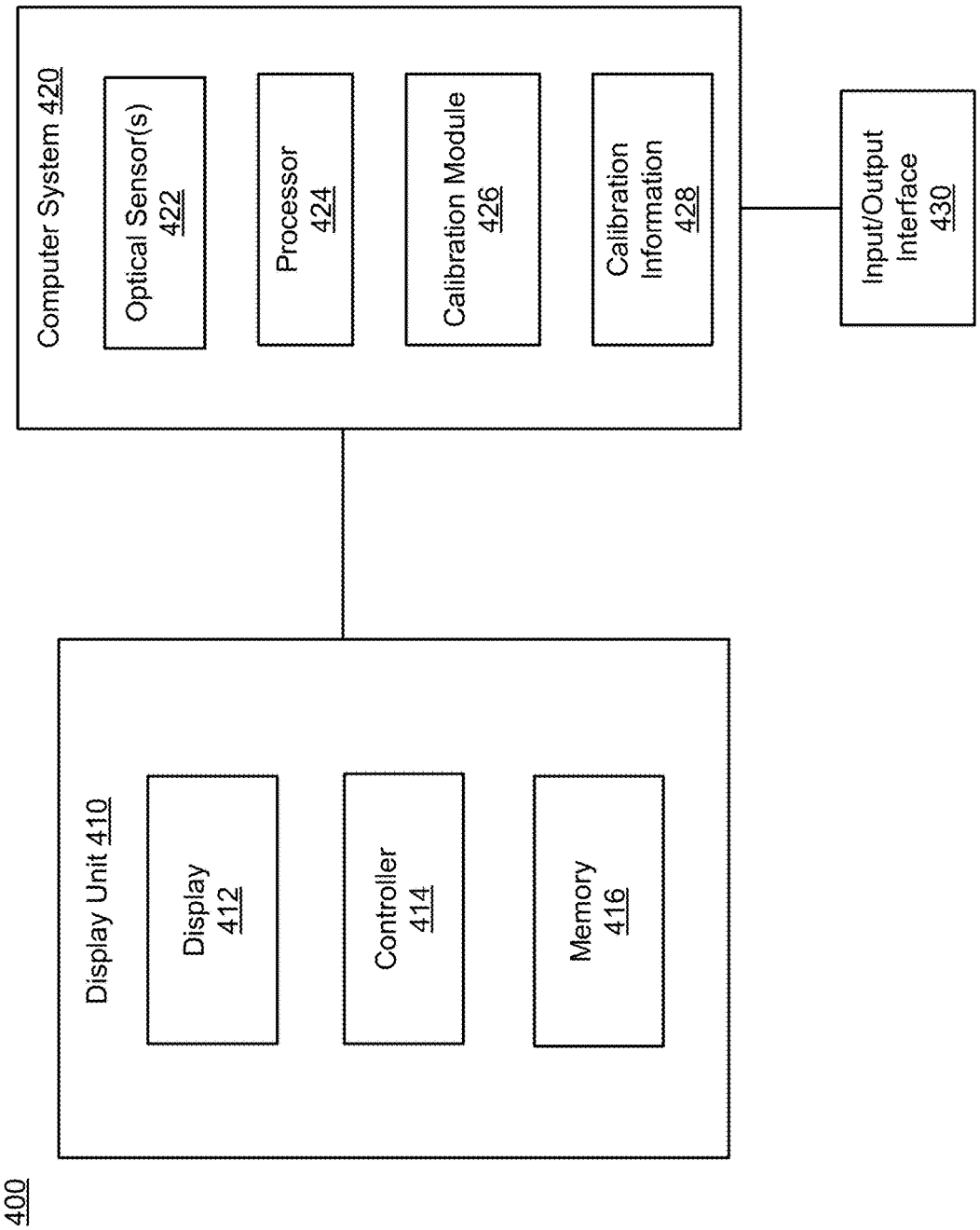
FIG. 4 is a block diagram of a system, in accordance with one or more embodiments.

FIG. 4 is a block diagram of an embodiment of a system 400 including a display unit 410, a computer system 420, and an input/output (I/O) interface 430. The display unit 410 includes a display 412, a controller 414, and a memory 416. In some embodiments, the display unit 410 is an NED (e.g., the NED 100). In other embodiments, the display unit 410 is a component of a non-wearable computer device. For example the display unit 410 can be a display unit for a computer display monitor, a laptop, a smartphone, or a television set.

The display 412 includes a plurality of light emitters organized in an array, e.g., more or more rows of mLEDs. In some embodiments, the array includes multiple rows and multiple columns of light emitters arranged in a 2D grid. In some embodiments, the rows may be offset in one or more dimensions, e.g., staggered in the horizontal direction. The display 412 may be configured to form an output image, e.g., a 1920×1080 resolution image. There may be a one-to-one correspondence between each pixel of the output image and the light emitters of the display 412. In some embodiments, the display 412 generates light that is mapped to form the output image using a scanning mirror. Thus, the resolution of the display 412 does not have to match the resolution of the output image.

The controller 414 operates the display 412 based on instructions for rendering one or more images. The instructions can be generated by an external device such as a console (not shown) or within the display unit 410 itself. In some embodiments, the controller 414 can execute one or more software applications that generate the instructions for rendering the images on the display 412, e.g., VR or AR applications, graphics drivers, operating systems, etc. The software applications can be stored locally, e.g., in the memory 416. In some embodiments, the controller 414 performs the functions described earlier with respect to the controller 330 including, for example, controlling a scanning mirror.

The memory 416 stores information for driving the light emitters of the display 412. For example, the memory 416 can store settings that adjust the operation of individual light emitters in accordance with a calibration procedure described below. In some embodiments, the memory 416 is a monolithic storage unit such as a block of flash memory, an erasable programmable read-only memory (EPROM), or some other form of non-volatile memory. In other embodiments, the memory 416 comprises a plurality of memory circuits inside individual emitter cells. For example, each light emitter can include its own memory circuit storing settings specific to that particular light emitter. In addition to storing the information for driving the light emitters, the memory 416 can include memory regions for storing additional items of information used in operating the display 412, e.g., the software applications mentioned above.

The computer system 420 includes one or more optical sensors 422, one or more processors 424, a calibration module 426, and calibration information 428. The optical sensor 422 is operable to measure the brightness levels of each light emitter. For example, the optical sensor 422 may be operable to perform a measurement of the luminous intensity of a light emitter, in units of candelas or lumens. In some embodiments, the optical sensor 422 is further operable to measure additional performance characteristics of the light emitters including, for example, wavelength. The computer system 420 can include optical sensors 422 for measuring brightness and wavelength, e.g., a photometer and a spectrometer or a combination photometer-spectrometer.

The processor 424 executes instructions for generating the calibration information 428, e.g., instructions provided by the calibration module 426. The processor 424 can be communicatively connected to the optical sensor 422 to direct the optical sensor 422 to perform a brightness measurement or other measurement in accordance with the instructions.

The calibration module 426 implements a calibration procedure for calibrating the display 412. The calibration module 26 can be a hardware module, a software module, or a combination of hardware and software. Example calibration procedures are described below.

The calibration information 428 includes information for driving the light emitters of the display 412. For example, the calibration information 428 can include voltage and/or current offsets for each light emitter, the offsets being derived from one or more calibration sessions performed for the display 412. In some embodiments, the display 412 is driven using pulse width modulation (PWM) to control the brightnesses of the light emitters and the calibration information 428 includes digital control values for generating pulses to be applied to the light emitters. For example, the calibration information 428 can include, for each light emitter, a set of control bits that are set based on a calibration procedure. In some embodiments, the calibration information 428 is organized as a lookup table in which each light emitter is individually indexed, e.g., by a row address and a column address.

The computer system 420 can transmit the calibration information 428 to the display unit 410 and/or the display 412. In some embodiments, the computer system 420 can transmit the calibration information 428 before the display 412 is integrated into the display unit 410. The computer system 420 may transmit the lookup table to the memory 416 or individually program the light emitters with appropriate settings in accordance with the calibration information 428. In some embodiments, the computer system 420 can perform a calibration after the display 412 has already been integrated into the display unit 410. For example, the computer system 420 can be configured to periodically monitor the performance of the display 412 in order to detect and correct for changes in brightness or color.

The I/O interface 430 allows a user of the computer system 420 to send action requests to the processor, including a request to initiate a calibration procedure or a request to transmit the calibration information 428 to the display unit 410 and/or the display 412. The I/O interface 430 can include one or more user input devices such as a keyboard, a touchscreen, a mouse, etc. The I/O interface 430 can also include one or more output devices that generate output to the user of the computer system 420, e.g., a speaker or a separate display monitor.

Figure 5A:
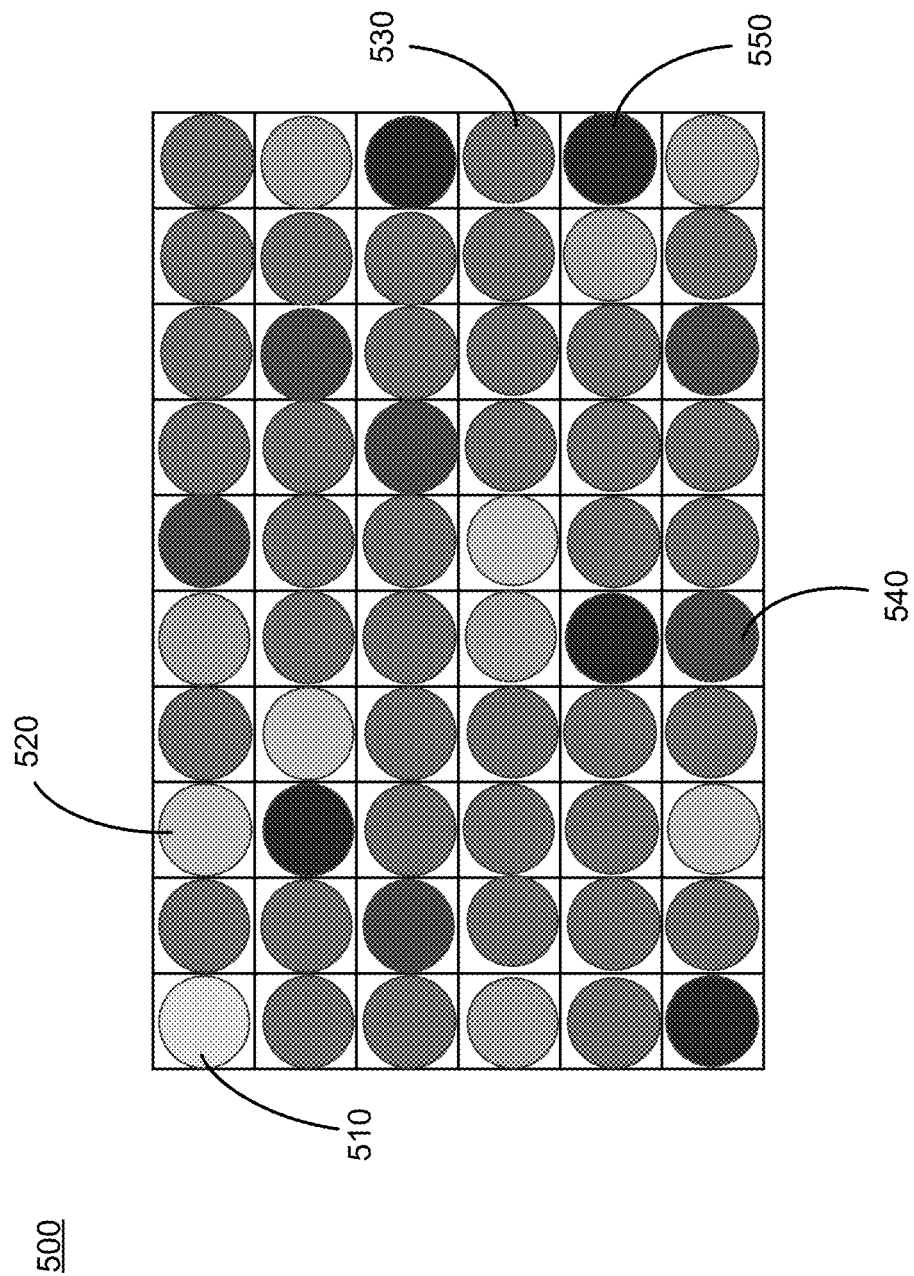
FIGS. 5A and 5B illustrate different brightness patterns in a display.

FIG. 5A shows an embodiment of a display 500. The display 500 comprises a plurality of light emitters, e.g., emitters 510 to 550. The display 500 is shown as a 6×10 array, but the dimensions of the display 500 can vary. For example, a display that is used in conjunction with a scanning mirror can include as few as one row of light emitters, i.e., a 1D display. In digital displays, individual pixels are generally formed using multiple light emitters of different colors. For example, a pixel can include a set of red light emitters, a set of green light emitters, and a set of blue light emitters. Each light emitter 530 to 550 is configured to output light of a specific color, e.g., red, green, or blue. For simplicity, the light emitters in FIG. 5A are shown as being of the same color. However, it will be understood that the display 500 can include a similar arrangement of light emitters for another color. As shown through shading in FIG. 5A, the brightnesses of the light emitters 510 to 550 can be different even though the light emitters 510 to 550 are supposed to have the same brightness. For example, at a driving current of 10 microamps, the brightnesses of the light emitters 510, 520, 530, 540, and 550 could be 60, 66, 75, 85, and 100 millicandelas (mcds), respectively. The light emitters in FIG. 5A can be calibrated so that the brightnesses are uniform, e.g., equal or the same within some specified brightness range.

Figure 5B:
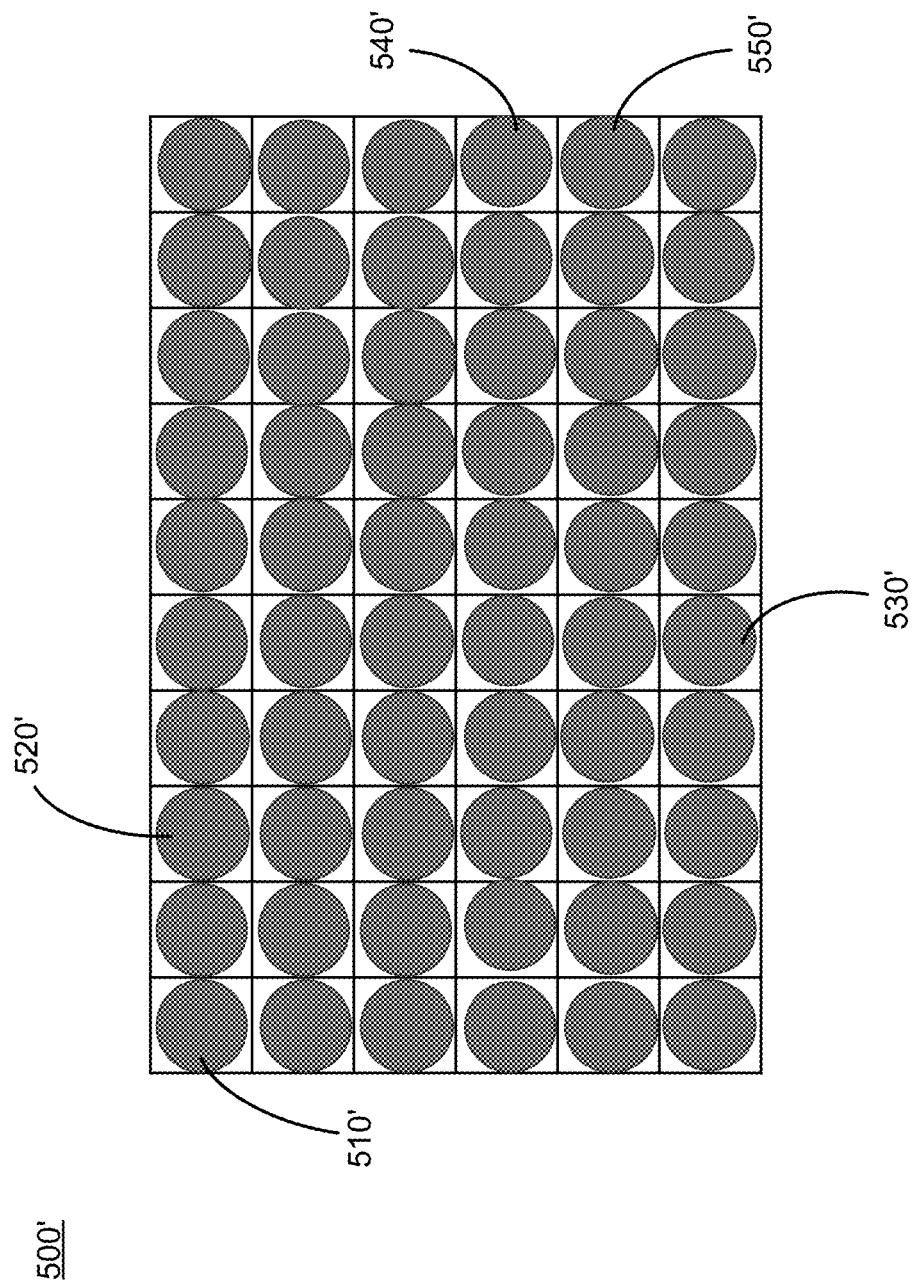

FIG. 5B shows a display 500' that has been calibrated to uniform brightness. For example, light emitters 510', 520', 530', 540', and 550' are shown as equally bright. It should be noted that the brightness levels depicted in FIGS. 5A and 5B are not necessarily based on instantaneous light output. Instead, the brightness levels can represent perceived brightness over a period of time, e.g., over a single frame period. As explained below, one way of calibrating brightness levels in accordance with an example embodiment is to drive the light emitters for different durations so that the perceived brightnesses are the same even though the light emitters are, in fact, unequally bright.

Figure 6:
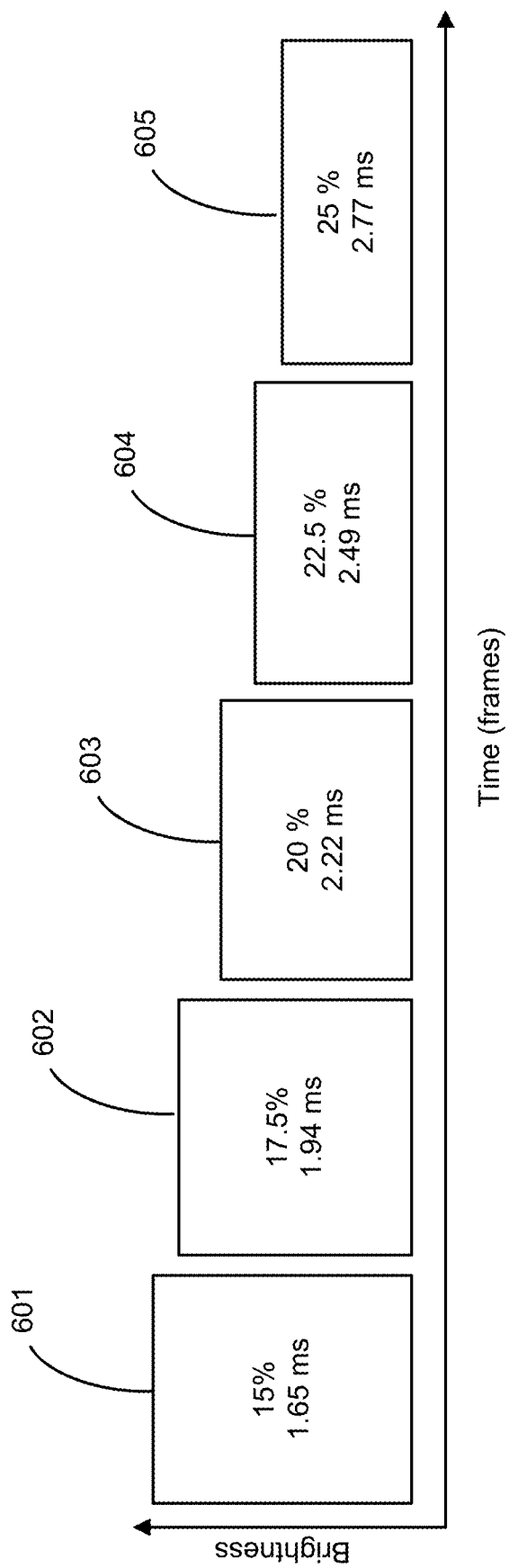
FIG. 6 illustrates grouping of light emitters into different sub-frames, in accordance with one or more embodiments.

FIG. 6 shows an example of how light emitters can be frame binned into different sub-frames for activation over a frame period, depending on brightness. Assuming a refresh rate of 90 Hertz (Hz), which corresponds to a frame period of approximately 11.1 milliseconds (ms), each frame can be divided into a set of sub-frames whose total duration is equal to or less than the frame period, with one group being assigned to each sub-frame. For example, a first sub-frame 601 equal to 15% of the frame period (1.65 ms) can be assigned to the brightest light emitters, a second sub-frame 602 equal to 17.5% (1.94 ms) assigned to the next brightest light emitters, then a third sub-frame 603 equal to 20% (2.22 ms), a fourth sub-frame 604 equal to 22.5% (2.49 ms), and finally a fifth sub-frame 605 equal to 25% (2.77 ms) assigned to the dimmest light emitters, thereby occupying 100% of the approximately 11.1 ms frame period. If the brightness level of the group assigned to sub-frame 601 is 100 mcds, then the emitters will produce a brightness of 15 mcd over the frame (100×15%). If the brightness level of the group assigned to sub-frame 602 is 85 mcd, then the emitters will produce of brightness of approximately 15 mcd over the frame (85×17.5%). Similarly, a brightness of 15 mcd or approximately 15 mcd can be achieved by assigning the sub-frame 603 to emitters having 75 mcd brightness, assigning the sub-frame 604 to emitters having 66.6 mcd brightness, and assigning the sub-frame 605 to emitters having 60 mcd brightness. In this way, the emitters will appear to be equally bright.

Each group can correspond to a single brightness value or to a brightness range. For example, referring back to FIG. 5A, the brightness variation among the light emitters of the display 500 may be distributed across five different brightness levels, of which the light emitters 510 to 550 are representative. Therefore each of the light emitters in the display 500 can be grouped into one of five frame bins. In some embodiments, the number of bins vary depending on the brightness distribution of the light emitters. For example, if the light emitters in the display 500 vary across ten different brightness values or brightness ranges, then the frame period could be divided into ten sub-frames.

Figure 7B:
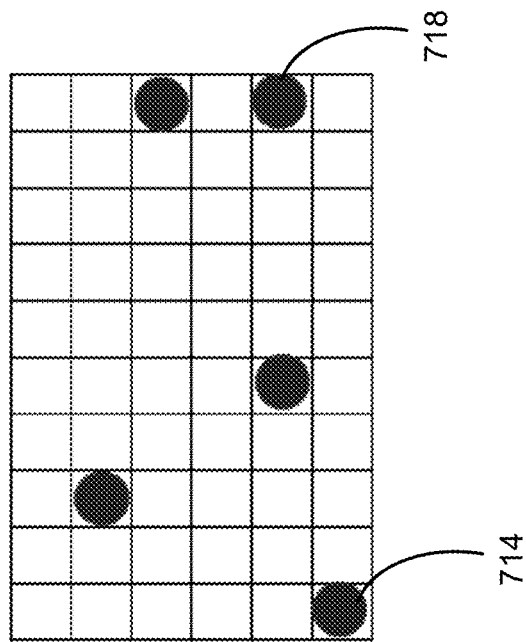
FIGS. 7A and 7B illustrate selective activation of emitters based on brightness.
Figure 7A:
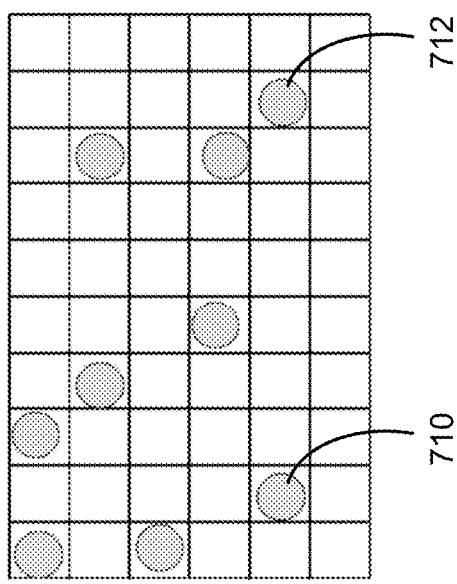

FIG. 7A shows activation of a first group of light emitters, including light emitters 710 and 712. The brightnesses of the light emitters 710 and 712 are the same or sufficient similar so that the light emitters 710 and 712 have been grouped together. FIG. 7A represents a single sub-frame, e.g., sub-frame 605. Similarly, FIG. 7B shows activation of a second group of light emitters, including light emitters 714 and 718, which have the same or similar brightness. FIG. 7B represents a second sub-frame, e.g., sub-frame 601.

Although FIG. 6 depicts a logical division of a single frame, FIG. 6 does not dictate the timing with which the light emitters are activated. Thus, the brightest group of light emitters could be activated for a corresponding sub-frame duration, e.g., to form the pattern shown in FIG. 7B, then deactivated to allow the next brightest group to be activated for a corresponding sub-frame duration. In this manner, the groups can be sequentially activated from brightest to dimmest or, alternatively, from dimmest to brightest. The sub-frames can be non-overlapping, e.g., with one group being deactivated immediately before the next group is activated or with a small period of non-emission between adjacent sub-frames. In some embodiments, the sub-frames can overlap in time. For example, the sub-frame assigned to the dimmest light emitters could completely overlap the sub-frame assigned to the brightest light emitters.

Figure 8:
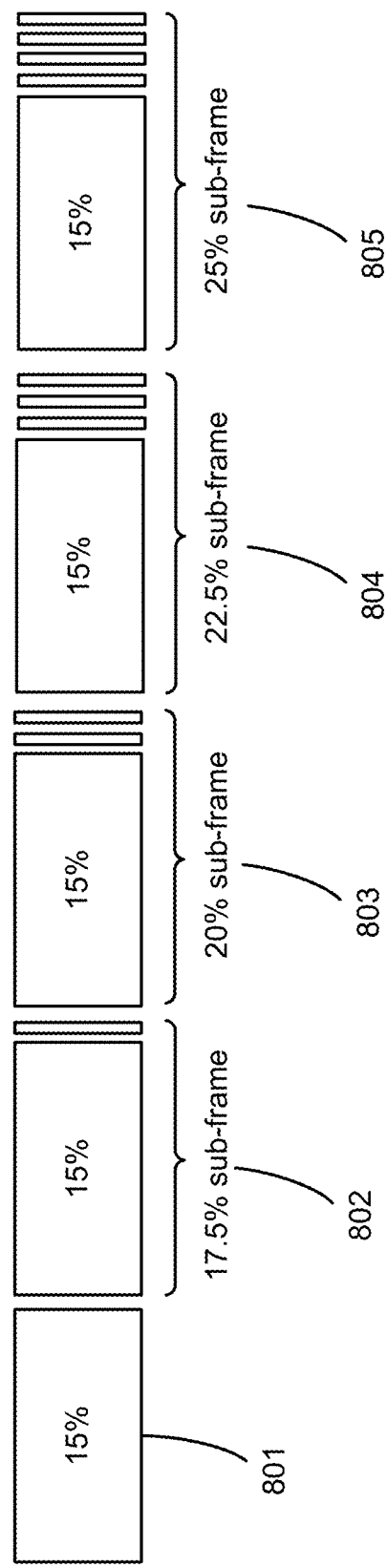
FIG. 8 illustrates a pulse width modulation scheme for driving light emitters, in accordance with one or more embodiments.

As mentioned earlier, the display can be driven using PWM. FIG. 8 shows an example PWM scheme for driving the light emitters during each sub-frame, using a base sub-frame duration. The base sub-frame duration corresponds to the shortest sub-frame, shown in FIG. 8 as a sub-frame 801. The base sub-frame duration has a duty cycle corresponding to the proportion of frame time occupied by sub-frame 801, e.g., a 15% duty cycle. This duty cycle can be established using one or more PWM pulses and corresponds to the shortest duty cycle permitted for any given sub-frame, i.e., a minimum duty cycle. Longer sub-frames 802, 803, 804, and 805 can be formed by extending the minimum duty cycle using one or more additional pulses. The additional pulses do not need to immediately follow the pulses that produce the base sub-frame duration. In some embodiments the additional pulses can be applied in a separate sub-frame, e.g., by splitting the sub-frame 803 into two or more sub-frames.

Figure 9:
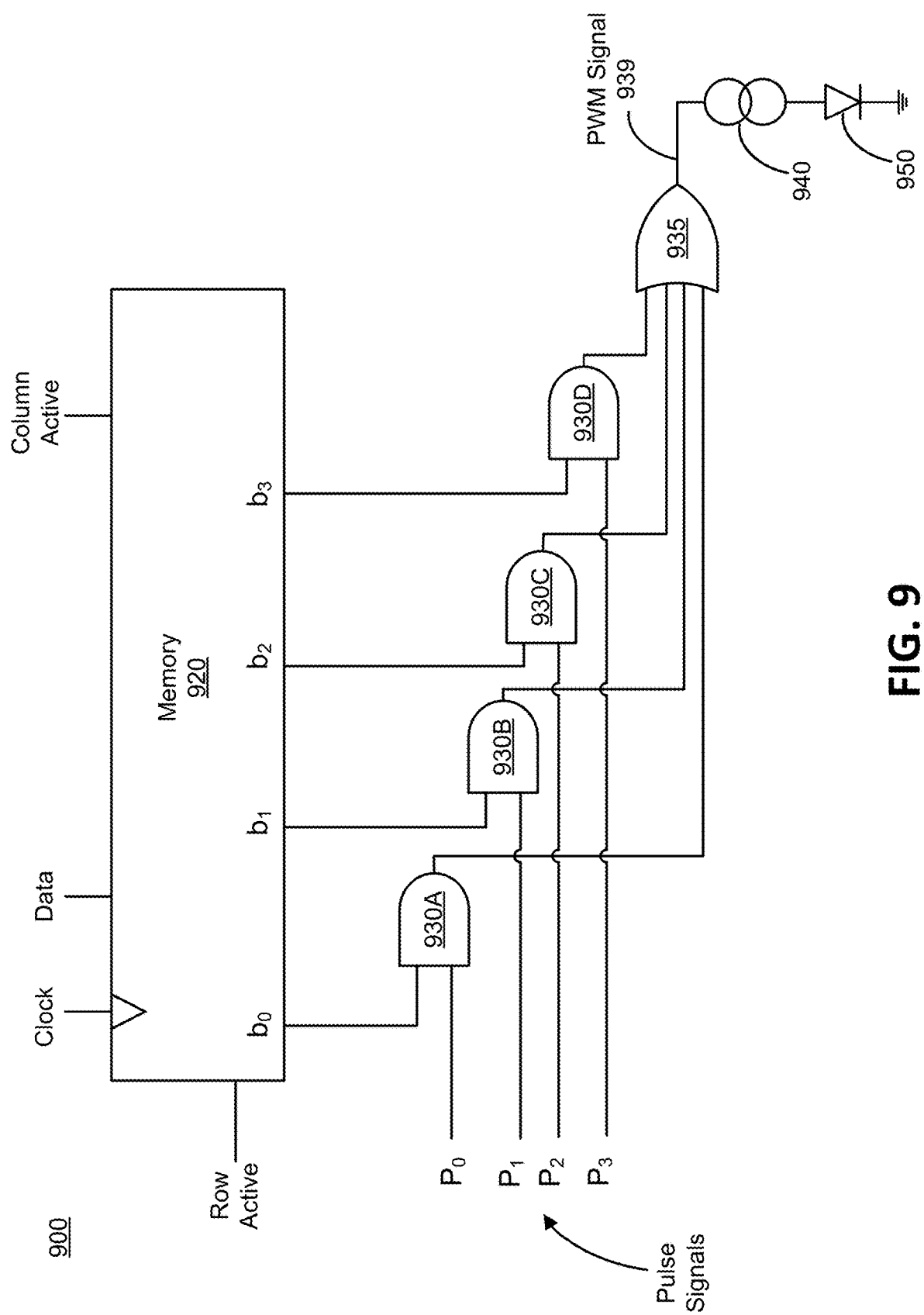
FIG. 9 is a circuit diagram of an example emitter cell that supports pulse width modulation.

FIG. 9 shows a circuit diagram of an example emitter cell 900 that supports PWM. The emitter cell 900 may include a memory 920, AND gates 930A to 930D, an OR gate 935, a current source 940, and an emitter 950 (e.g., an mLED). In another embodiment, an emitter cell could be voltage driven using PWM. Thus, the current source 940 could be replaced by a voltage source. The memory 920 includes storage elements (not shown) that store a digital value (labeled "Data") indicative of a desired brightness for the emitter 950. The digital value stored by the memory 920 is updated in each frame period and can, for example, be a 4-bit value that indicates the desired brightness of the emitter 950. A 4-bit value provides for 16 different brightness levels. In some embodiments, memory 920 may store larger values (i.e., values with deeper bit depth), such as 8-bit values or 10-bit values. The memory 920 includes multiple outputs $b_0$ to $b_3$. In some embodiments, the memory 920 has a different number of outputs than the bit depth of the stored digital value.

The memory 920 further includes a clock input, a column active input, and a row active input. The memory 920 stores the digital value when the column active input and the row active input are both asserted (thereby selecting the emitter cell 900 from among a plurality of emitter cells that are row and column addressed) and a clock signal is provided through the clock input.

Each gate 930A to 930D and 935 is a logic gate that receives at least two inputs and produces one output. The output of each AND gate 930A to 930D has a high level (HI) when the voltage level for both inputs are above some threshold value, and has a low level (LO) when the voltage level of at least one input is below the threshold value. As shown in FIG. 9, a first input of each AND gate corresponds to one of the outputs $b_0$ to $b_3$ of the memory 920. A second input of each AND gate corresponds to one of a plurality of pulse signals ($P_0$ to $P_3$). Each pulse signal $P_0$ to $P_3$ operates to select a memory output ($b_0$, $b_1$, $b_2$, or $b_3$) for transmission to the OR gate 935. In some embodiments, the functionality of the AND gates 930A to 930D can be incorporated into the memory 920 itself. The pulse signals $P_0$ to $P_3$ and the digital value stored by the memory 920 can be supplied by a display controller, e.g., controller 414. In some embodiments, the emitter cell 900 is programmable and the pulse signals or digital values supplied by the display controller are modified based on calibration information programmed into the emitter cell 900.

The OR gate 935 combines the outputs of the AND gates 930A to 930D to form a digital PWM signal 939. The OR gate 935 and outputs HI when the voltage level for any one of the AND gate outputs are above some threshold value, and outputs LO when the voltage level of all the AND gate outputs are below the threshold value. In some embodiments, each AND gate 930A to 930D only has one of a pull up network or a pull down network. For instance, each AND gate may have a pull up network that sets a HI output when both inputs are above the threshold, but has a floating output (e.g., a high impedance output) when one of the inputs is below the threshold. In embodiments where the AND gates 930A to 930D only have one of a pull up network or a pull down network, an OR gate that combines the output of the AND gates (e.g., OR gate 935) can be omitted.

The current source 940 generates a current based on the digital PWM signal 939 for driving the emitter 950. In some embodiments, the current source 940 includes a transistor that turns on and off based on the digital PWM signal 939. That is, the transistor of the current source 940 conducts current from a supply voltage when the digital PWM signal is in the ON state and blocks current from passing when the digital PWM signal is in the OFF state. The amount of current generated by the current source 940 determines the brightness of the light output by the emitter 950. In particular, brightness is directly proportional to current. The current generated by the current source 940 also has a slight effect on the wavelength of the light output by the emitter 950. A larger current produces a higher temperature in the emitter, which in turn increases the emitted wavelength. The current source 940 can be adjusted to compensate for a deviation in the wavelength of the emitter 950, e.g., by increasing the current when wavelength is smaller than expected.

Figure 10:
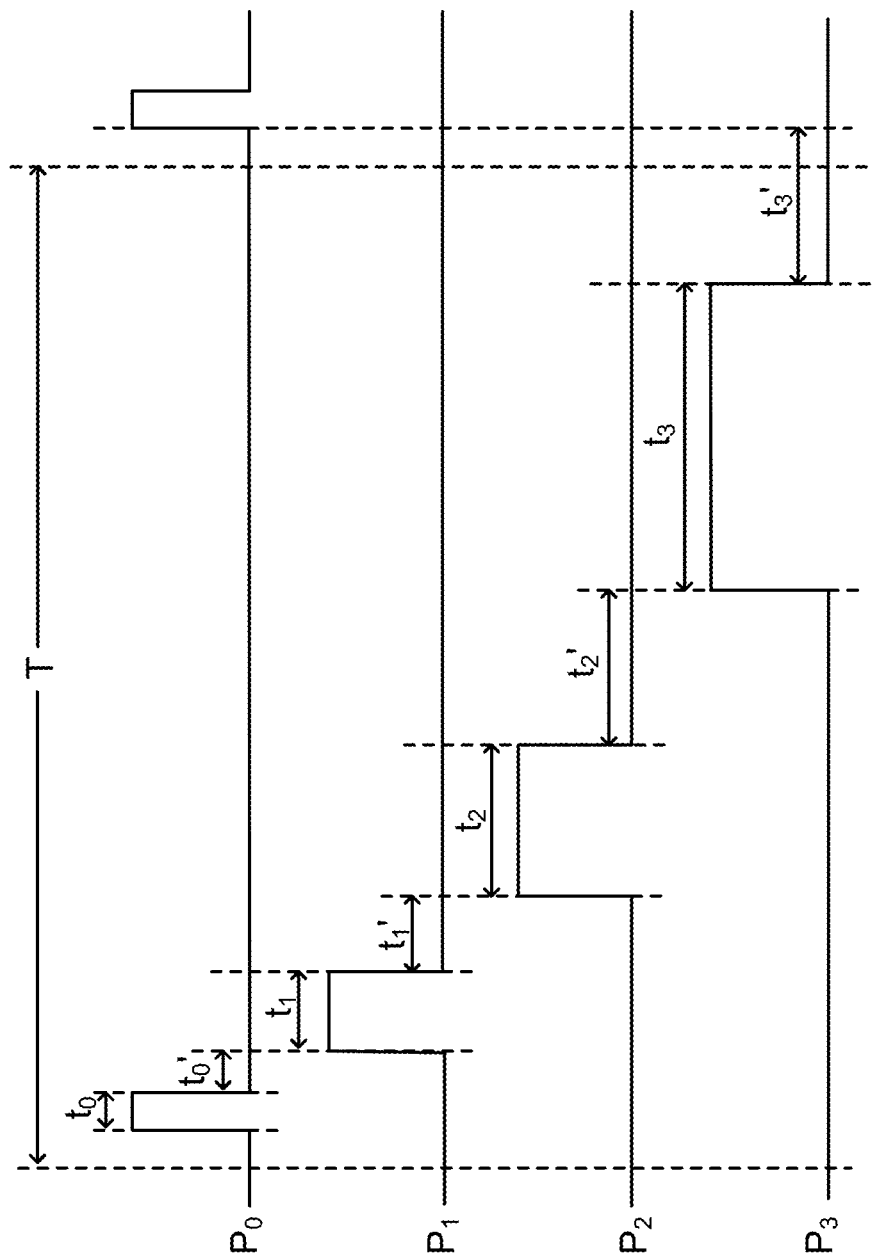
FIG. 10 is a timing diagram for one cycle of pulse signals that provide pulse width modulation of an emitter cell.

FIG. 10 illustrates an example timing diagram for one cycle of the pulse signals $P_0$ to $P_3$. The horizontal axis represents time, and the vertical axis represents the voltage of the pulse signals. The pulses of pulse signal $P_0$ have a duration of $t_0$. The pulses of pulse signal $P_1$ have a duration of $t_1$ and are delayed with respect to the pulses of pulse signal $P_0$ by a duration $t_0'$. The pulses of pulse signal $P_2$ have a duration of $t_2$ and are delayed with respect to the pulses of pulse signal $P_1$ by a duration $t_1'$. The pulses of pulse single $P_3$ have a duration of $t_3$ and are delayed with respect to the pulses of pulse signal $P_2$ by a duration $t_2'$. Each of the pulse signals $P_0$ to $P_3$ are repeated every frame period T. The time between the end of a pulse in pulse signal $P_3$ and the beginning of the next pulse in pulse signal $P_0$ is $t_3'$.

Referring back to FIG. 6, and again assuming a refresh rate of 90 Hz, the pulse signals $P_0$ to $P_3$ can be set so that the sum of the durations $t_0+t_0'+t_1+t_1'+t_2+t_2'+t_3+t_3'$ is equal to the frame period T of 11.1 ms. Further, the pulse signals $P_0$ to $P_3$ can be set so that the sum of durations $t_0+t_1+t_2+t_3$ corresponds to the desired duty cycle of the sub-frame (e.g., $t_0+t_1+t_2+t_3=1.65$ ms for sub-frame 601). In FIG. 10, the pulse durations $t_0$, $t_1$, $t_2$, and $t_3$ are shown as being of different lengths, e.g., $t_1$ is longer than $t_0$. However, in some embodiments the pulse durations $t_0$, $t_1$, $t_2$, and $t_3$ can be the same length.

The pulse signals $P_0$ to $P_3$ can be generated in various ways. In one embodiment, pulses $P_0$ to $P_3$ are generated by a chain of D-type flip-flops, with one flip-flop stage for each pulse signal and each flip-flop stage being driven by an adjustable clock that controls the durations $t_n$ and $t_n'$ for that particular pulse signal. In another embodiment, the durations $t_n$ and $t_n'$ are controlled by separate clocks. In another embodiment, the pulses $P_0$ through $P_3$ are generated using a lookup table that contains values corresponding to the relevant times $t_n$ and $t_n'$. The lookup table can be hardcoded (e.g., in implementations where the display is only calibrated once) or reprogrammable.

Figure 11:
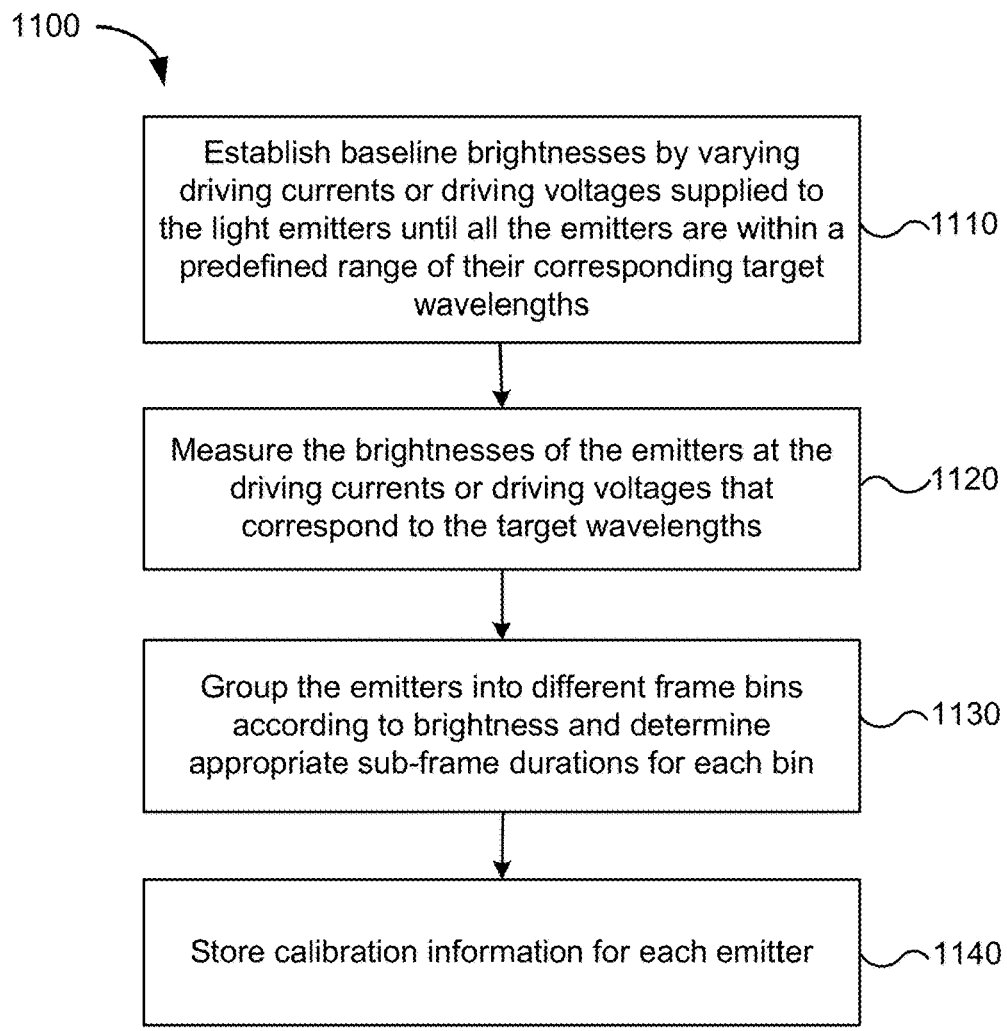
FIG. 11 is a flow diagram of a method for calibrating a display, in accordance with one or more embodiments.

FIG. 11 is a flow diagram of a method 1100 for calibrating a display. The method 1100 can be performed by the computer system 420 and includes steps for calibrating both brightness and wavelength. In step 1110, a wavelength calibration is performed by varying driving currents or driving voltages of each emitter in the display until all the emitters are within a predefined range of their corresponding target wavelengths. An example wavelength calibration procedure can include, for example, applying an initial driving current of 10 microamps to a green emitter, measuring the wavelength using an optical sensor, increasing or decreasing the driving current until the measured wavelength is 530 nanometers (nm)±10 nm, and storing information indicating the value of the driving current or driving voltage when the emitter is within range of the target wavelength. Calibrating the wavelengths establishes baseline brightnesses for the emitters.

In step 1120, the baseline brightnesses are measured. Step 1120 can be performed concurrently with the wavelength calibration in step 1110. For example a brightness measurement can be performed each time a wavelength is measured, in order to capture the brightness at the final wavelength measurement for a given emitter. Alternatively, a brightness measurement for an emitter can be postponed until the final wavelength measurement is made. In some embodiments, brightness measurements are performed in a separate calibration phase, e.g., by first calibrating the wavelengths of all the emitters, then individually activating each emitter using a respective driving current or driving voltage corresponding to a target wavelength and measuring the brightness at that driving current/voltage.

In step 1130, the emitters are grouped into different frame bins according to brightness, each bin corresponding to a sub-frame, and appropriate durations are determined for each sub-frame. As discussed earlier in connection with FIG. 6, the frame binning process groups together emitters that are of the same or similar brightness and assigns a sub-frame to each group. The durations of the sub-frames can be calculated so that the brightness of one group is perceived to be the same as the brightness of any other group when viewed by a human. An example method for frame binning is described below in connection with FIG. 12.

In step 1140, calibration information is stored for each emitter. Calibration information can include, for example, an offset value indicating the driving current needed for the emitter to be within range of its target wavelength, a sub-frame identifier indicating which sub-frame the emitter belongs to, and a value indicating the duration or duty cycle at which the emitter should be driven in order to achieve uniform brightness relative to the other emitters. The portions of the calibration information that set wavelength and the portions of the calibration that set brightness can be applied simultaneously by a display controller when driving the emitter, so that both a target wavelength and a target brightness are achieved. The calibration information does not have to store the same durations or duty cycles that were assigned to the groups. For example, the assigned durations can be scaled or modified for calibration purposes. In some embodiments, the calibration information is maintained in a memory of the computer system 420. In other embodiments, the calibration information is stored in a memory of the display unit 410 or programmed into the display 412.

Figure 12:
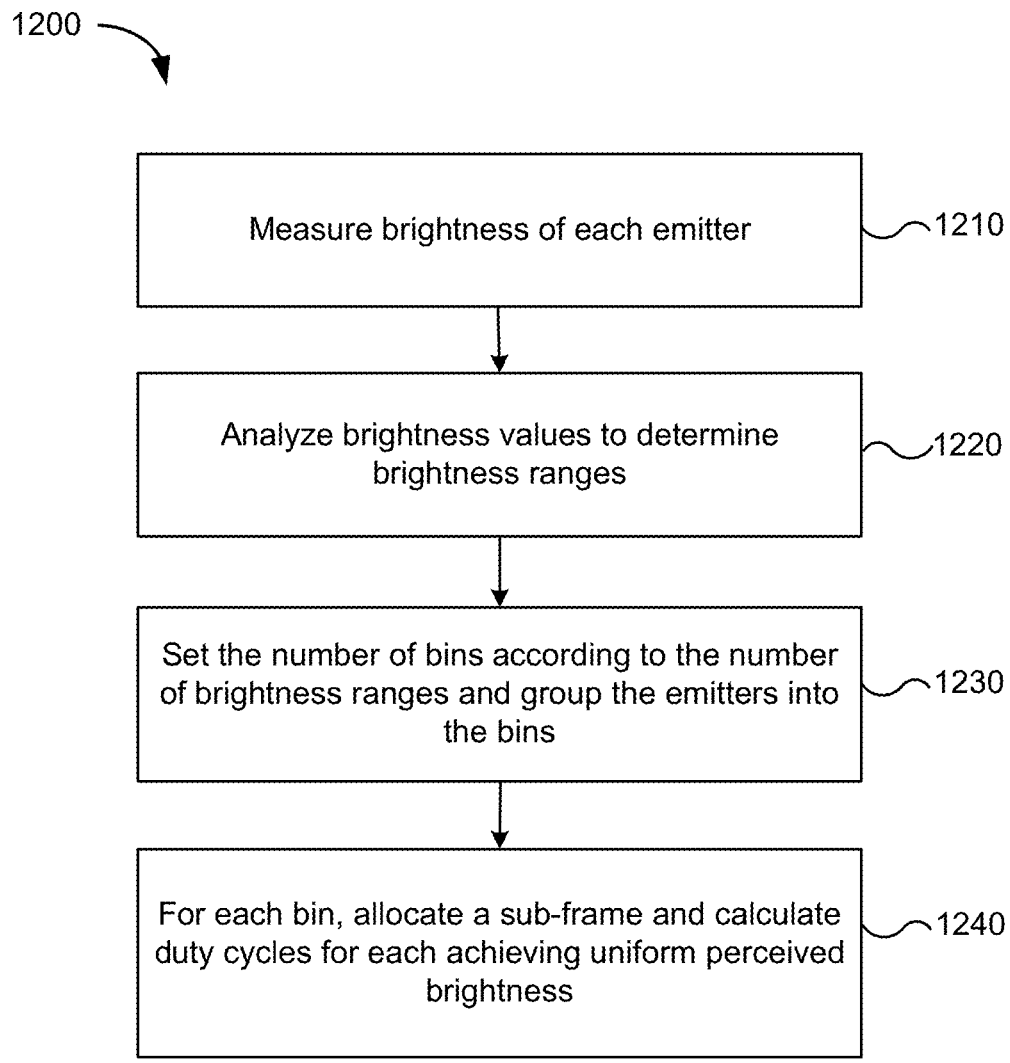
FIG. 12 is a flow diagram of a method for frame binning in connection with calibration of a display, in accordance with one or more embodiments.

FIG. 12 is a flow diagram of a method 1200 for frame binning in connection with calibration of a display. At step 1210, the brightness of each emitter is measured. The emitters can be activated one at a time using an initial driving current or an initial driving voltage (e.g., a nominal current of 10 microamps) or using a respective driving current/voltage that was previously determined through wavelength calibration.

At step 1220, the brightness values are analyzed to determine different brightness ranges. For example, the brightness measurements may indicate that most of the emitters are at exactly 60, 66, 75, 85, or 100 mcds, with some of the emitters deviating by ±2 mcds from one of the aforementioned brightness values. Thus, a first range could be set for brightness 58-62, a second range for brightness 64-68, a third range for brightness 73-77, a fourth range for brightness 83-87, and a fifth range for 98-100.

At step 1230, the number of frame bins is set according to the number of ranges and the emitters are grouped into the bins. Continuing with the example above, each emitter would be placed into one of five bins depending on brightness.

At step 1240, a sub-frame is allocated for each frame bin and the duty cycles needed for achieving uniform perceived brightness are calculated. For example, based on the ranges discussed above, the duty cycles can be calculated by dividing a target brightness (e.g., 15 mcd) by the average or median brightness of each bin (e.g., 60, 66, 75, 85, and 100) to produce the 15%, 17.5%, 20%, 22.5%, and 25% values discussed earlier in connection with FIG. 6.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method for calibrating brightness variation, comprising:
measuring brightness levels of light emitters in a display;
after measuring the brightness levels of the light emitters, dividing the light emitters into different groups based on the measured brightness levels, wherein each group of the different groups is associated with a different brightness, and wherein dividing the light emitters into different groups comprises assigning light emitters whose measured brightness levels are the same or within a certain range of each other to a same group;
assigning a sub-frame duration to each group, wherein a group with higher brightness is assigned a shorter sub-frame duration than a group with lower brightness, and storing calibration information for driving the light emitters such that during a frame period of the display, each light emitter is activated for a duration corresponding to the sub-frame duration assigned to its corresponding group.

2. The method of claim 1, further comprising:
setting a target wavelength for each light emitter; and
establishing baseline brightness levels by varying driving currents or driving voltages supplied to the light emitters until all the light emitters are within a predefined range of their target wavelength, wherein the measured brightness levels are the baseline brightness levels.

3. The method of claim 2, further comprising:
storing additional calibration information for driving the light emitters according to the driving currents or driving voltages at which the baseline brightness levels were established.

4. The method of claim 3, wherein the calibration information and the additional calibration information are simultaneously applied when driving the light emitters.

5. The method of claim 1, further comprising:
calculating the sub-frame durations such that light emitters of different groups are perceived as equally bright by a human.

6. The method of claim 1, further comprising:
programming the light emitters using the calibration information.

7. The method of claim 1, further comprising:
storing the calibration information in a lookup table in which each light emitter is individually indexed, the lookup table being referenced to drive the light emitters during the frame period of the display.

8. The method of claim 1, further comprising:
calculating each sub-frame duration based on an average or median brightness of the group to which the sub-frame duration is assigned.

9. The method of claim 1, wherein the calibration information determines a duty cycle for pulse width modulation control of the light emitters.

10. The method of claim 9, wherein each light emitter is configured for a minimum duty cycle comprising one or more pulses, and wherein the calibration information extends the minimum duty cycle to achieve a longer sub-frame duration for at least one group by adding one or more additional pulses.

11. A computer system for calibrating brightness variation, comprising:
at least one optical sensor operable to measure brightness levels of light emitters in a display;
one or more processors;
a memory storing instructions which, when executed by the one or more processors, cause the one or more processors to:
after the brightness levels of the light emitters are measured by the at least one optical sensor, divide the light emitters into different groups based on the measured brightness levels, wherein each group of the different groups is associated with a different brightness, and wherein to divide the light emitters into different groups, the one or more processors assign light emitters whose measured brightness levels are the same or within a certain range of each other to a same group;
assign a sub-frame duration to each group, wherein a group with higher brightness is assigned a shorter sub-frame duration than a group with lower brightness, and
store calibration information for driving the light emitters such that during a frame period of the display, each light emitter is are activated for a duration corresponding to the sub-frame duration assigned to its corresponding group.

12. The computer system of claim 11, wherein the instructions further cause the one or more processors to:
set a target wavelength for each light emitter; and
establish baseline brightness levels by varying driving currents or driving voltages supplied to the light emitters until all the light emitters are within a predefined range of their target wavelength, wherein the measured brightness levels are the baseline brightness levels.

13. The computer system of claim 12, wherein the instructions further cause the one or more processors to:
store additional calibration information for driving the light emitters according to the driving currents or driving voltages at which the baseline brightness levels were established.

14. The computer system of claim 13, further comprising:
a display device including the display and a controller, the controller configured to drive the light emitters, wherein the controller applies the calibration information and the additional calibration information simultaneously applied when driving the light emitters.

15. The computer system of claim 11, wherein the instructions further cause the one or more processors to:
calculate the sub-frame durations such that light emitters of different groups are perceived as equally bright by a human.

16. The computer system of claim 11, wherein the instructions further cause the one or more processors to:
program the light emitters using the calibration information.

17. The computer system of claim 11, further comprising:
a display device including the display and a controller, the controller configured to drive the light emitters, wherein the instructions further cause the one or more processors to:
store the calibration information in a lookup table in which each light emitter is individually indexed, the lookup table being referenced by the controller to drive the light emitters during the frame period of the display.

18. The computer system of claim 11, wherein the instructions further cause the one or more processors to:
calculate each sub-frame duration based on an average or median brightness of the group to which the sub-frame duration is assigned.

19. The computer system of claim 11, further comprising:
a display device including the display and a controller, the controller configured to drive the light emitters through pulse width modulation, wherein the calibration information determines a duty cycle for the pulse width modulation.

20. The computer system of claim 19, wherein each light emitter is configured for a minimum duty cycle comprising one or more pulses, and wherein the calibration information extends the minimum duty cycle to achieve a longer sub-frame duration for at least one group by adding one or more additional pulses.

* * * * *